R. W. FOSTER.
BLOW-OFF VALVE.
APPLICATION FILED MAR. 10, 1915.
1,299,452.
Patented Apr. 8, 1919.
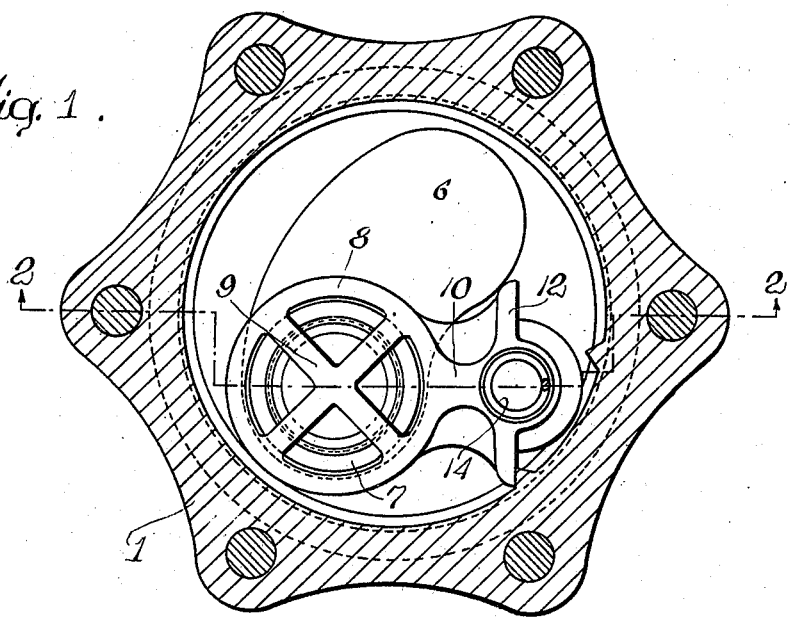
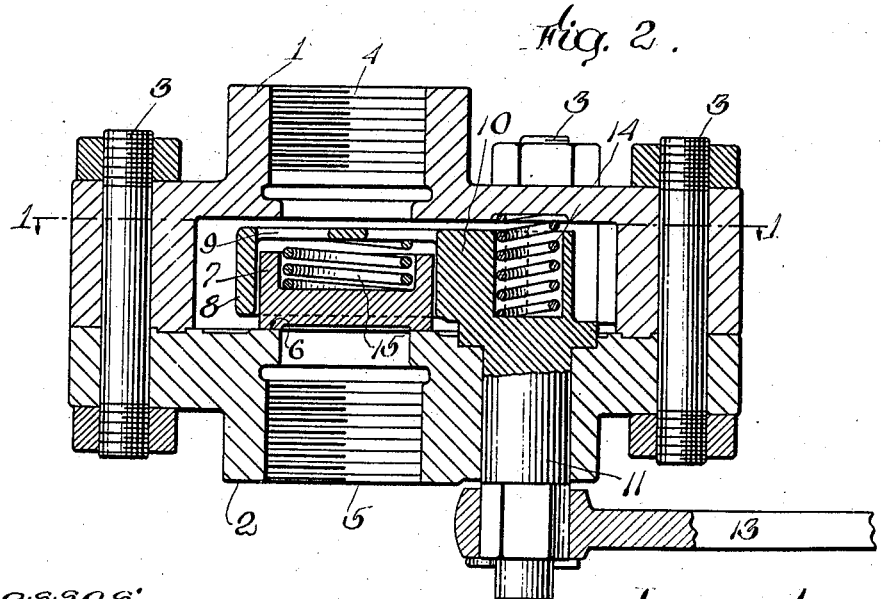

UNITED STATES PATENT OFFICE.

RALPH W. FOSTER, OF BOSTON, MASSACHUSETTS, ASSIGNOR TO CROSBY STEAM GAGE & VALVE COMPANY, OF BOSTON, MASSACHUSETTS, A CORPORATION.

BLOW-OFF VALVE.

1,299,452.  Specification of Letters Patent.  Patented Apr. 8, 1919.

Application filed March 10, 1915. Serial No. 13,470.

*To all whom it may concern:*

Be it known that I, RALPH W. FOSTER, a citizen of the United States, and a resident of Boston, in the county of Suffolk and State of Massachusetts, have invented certain new and useful Improvements in Blow-Off Valves, of which the following is a specification.

This invention relates to blow-off valves of the swinging-gate type and its object is to provide an efficient valve of simple construction and few parts so combined as to secure easy action, while reducing to a minimum the friction of the parts and the deterioration caused thereby.

It is illustrated by the accompanying drawings in which:

Figure 1 is a sectional view on the line 1—1 Fig. 2; and

Fig. 2 is a sectional view on the line 2—2 Fig. 1.

The valve casing comprises two members 1 and 2 fastened together by bolts 3 and furnished respectively with the induction port 4 and the eduction port 5; the member 2 being furnished also with the valve seat 6 extended as shown. The valve 7 is cup-shaped and fits loosely in the stirrup 8, similarly shaped but having a perforated bottom 9; said stirrup having an arm 10 rigidly affixed to or integral with the spindle 11 and furnished with the wings 12 adapted to engage the wall of member 2 and thereby limit the swing of the arm. The spindle 11 is oscillatingly mounted in the member 2, being centrally flanged to engage the inner wall of said member, while to its outer end is removably attached the lever 13, whereby it may be oscillated; the inner end of said spindle being recessed to receive the spring 40 14 disposed therein between the spindle and member 1 of the casing and adapted to restrain longitudinal movement of the spindle. The spring 15 is disposed in the valve 7 between it and the stirrup 8 and serves as 45 an independent means, additional or supplementary to the fluid pressure, to hold the valve to its seat.

I claim:

A valve of the character described comprising, in combination, a casing having induction and eduction ports; a valve seat within the casing and adjacent the eduction port; an oscillatory stirrup disposed in the casing and spaced from the adjacent 55 walls thereof and furnished with wings adapted to engage the casing and limit such oscillatory movement; a valve for said seat loosely disposed in the stirrup; a spindle mounted in the casing and rigidly affixed to 60 the stirrup; and means for oscillating the spindle and thereby the stirrup and the valve disposed therein.

In testimony whereof I have affixed my signature, in presence of two witnesses.

RALPH W. FOSTER.

Witnesses:
ETHEL W. FAXON,
CLARENCE L. NEWTON.